United States Patent [19]

Colasanti

[11] 4,000,385
[45] Dec. 28, 1976

[54] ELECTRIC SWITCH FOR SAFETY BELT BUCKLE WITH WIPING SELF CLEANING CONTACT STRUCTURE

[75] Inventor: Arduino Colasanti, East Detroit, Mich.

[73] Assignee: Allied Chemical Corporation, Morris Township, N.J.

[22] Filed: Nov. 6, 1975

[21] Appl. No.: 629,354

[52] U.S. Cl. .................. 200/61.58 B; 200/164 R; 200/241
[51] Int. Cl.² ................... H01H 3/16; H01H 1/18
[58] Field of Search ..... 200/61.58 B, 164, 237–251

[56] References Cited
UNITED STATES PATENTS

| | | | |
|---|---|---|---|
| 3,269,483 | 8/1966 | Garner, Jr. | 200/61.58 B X |
| 3,670,119 | 6/1972 | Gebhardt et al. | 200/61.58 B X |
| 3,833,781 | 9/1974 | Rumpf | 200/61.58 B X |
| 3,840,849 | 10/1974 | Lohr | 200/61.58 B X |
| 3,895,196 | 7/1975 | Lewis | 200/61.58 B |
| 3,911,236 | 10/1975 | Poulsen | 200/61.58 B |

*Primary Examiner*—James R. Scott
*Attorney, Agent, or Firm*—John P. Kirby, Jr.

[57] ABSTRACT

An electric switch is disposed in a cavity of a buckle. The electric switch includes a stationary first contact member, a movable second contact member, and a biasing means for the second contact member. The biasing means biases the second contact member to the open position of the electric switch. The electric switch has means by which the contact end portion of the second contact member makes a wiping, self-cleaning contact with a part of the first contact member upon actuation by a tongue of the buckle.

20 Claims, 7 Drawing Figures

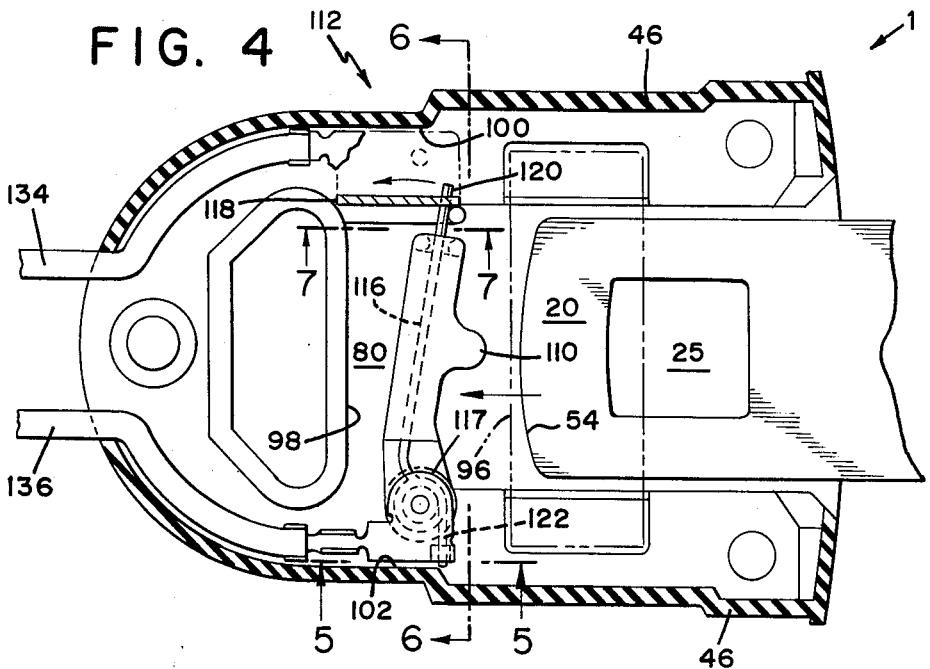
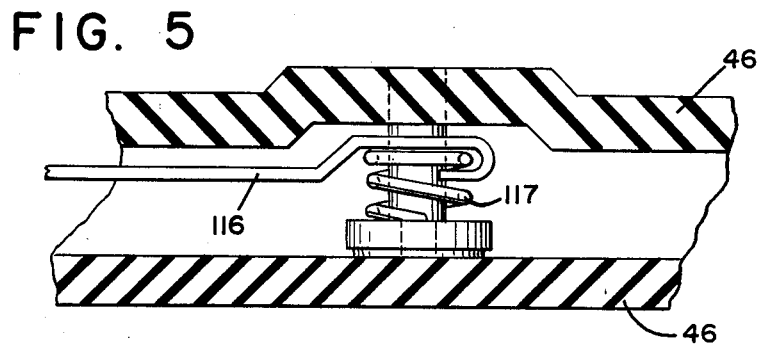
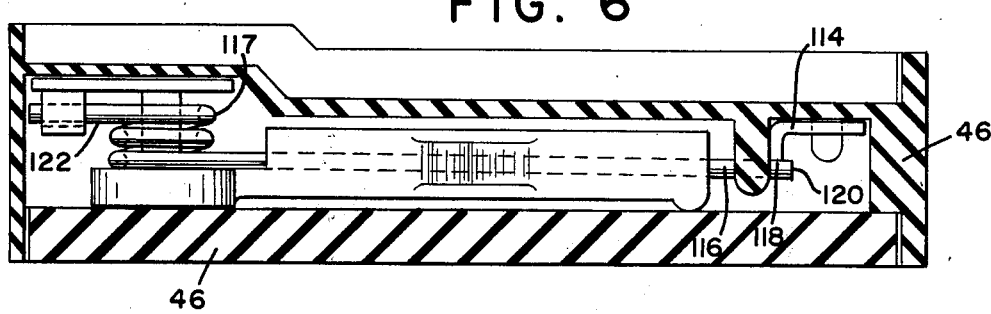
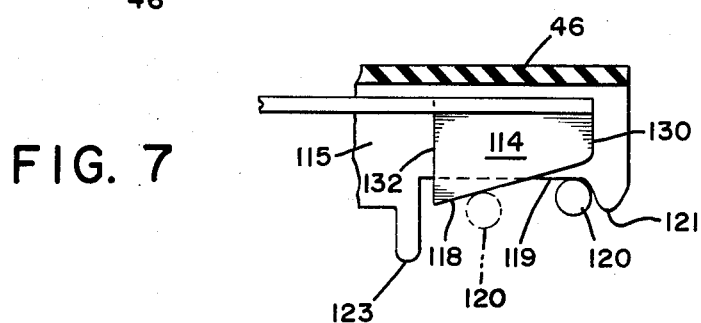

ELECTRIC SWITCH FOR SAFETY BELT BUCKLE WITH WIPING SELF CLEANING CONTACT STRUCTURE

BACKGROUND OF THE INVENTION

The invention relates to an electric switch for uses such as in a buckle for a safety belt. Vehicle safety belts are used to restrain a seated occupant, either passenger or driver, in a vehicle, such as an automobile, during emergency conditions. More particularly, the electric switch includes a contact member which makes a wiping and self-cleaning contact with another contact member of the electric switch when the switch is closed, thereby improving electric contact between the two contact members of the switch. The electric switch is disposed in the buckle and closes when a tongue of the safety belt is inserted in the buckle of the safety belt. As a result, the electric switch indicates when a user, either driver or occupant of the vehicle, fastens the safety belt. A different type of electric switch for a safety belt buckle is disclosed in U.S. patent application Ser. No. 629,352 filed concurrently herewith in the name of Y. S. Loomba entitled "Electric Switch for Safety Belt Buckle." A different type of electric switch for a retracter for a vehicle safety belt is disclosed in U.S. patent application Ser. No. 210,532 filed Dec. 21, 1971 in the name of F. C. Booth and entitled "Retractor With Switch," now U.S. Pat. No. 3,880,379

SUMMARY OF THE INVENTION

An object of the present invention is to provide an electric switch which is adapted for use in a wide variety of buckles of the type including a switch cavity therein in which the electric switch is disposed. A second object of the present invention is to provide a switch which has a self-cleaning operation, thereby reducing malfunctions resulting, for example, from dirt or other matter forming in the electrical contact area of the switch. A third object of the present invention is to provide an electric switch which is small enough to fit in a limited space, such as a cavity of a buckle, which is simple and economical to manufacture and assemble, and which is durable in operation.

The electric switch of the present invention includes a stationary first contact member, a movable second contact member, and a biasing means for the second contact member. The stationary first contact member has at least a line of contact. The movable second contact member has an elongated shape, a movable contact end portion and a stationary mounting end portion. The electric switch has a closed position when the contact end portion of the second member is in contact with the line of contact of the first contact member. The electric switch has an open position when the contact end portion of the second contact member is not in contact with the line of contact of the first contact member. The biasing means biases the second contact member to the open position of the electric switch.

At least the contact end portion of the second contact member has motion which includes motion in a first plane prior to initial contact with the first contact member and while the contact end portion of the second contact member is moving between the open position of said electric switch and the closed position of said electric switch. The electric switch has means by which the contact end portion of the second contact member makes a wiping, self-cleaning contact with at least a part of the contact surface of the first contact member upon actuation by the tongue of the buckle when the tongue is inserted into the housing of the buckle. Two embodiments are disclosed providing such means by which such wiping, self-cleaning contact is achieved.

DESCRIPTION OF THE DRAWINGS

FIG. 4 is an enlarged plan view of a safety buckle in partial cross section similar to that illustrated in FIG. 1, but containing a second embodiment of the electric switch of the present invention in its open position.

FIG. 5 is a section taken along line 5—5 of FIG. 4.

FIG. 6 is an enlarged section taken along line 6—6 of FIG. 4.

FIG. 7 is an enlarged section taken along the line 7—7 of FIG. 4.

DETAILED DESCRIPTION

The electrical switch of the present invention may, for example, be used in a buckle which has, or can be modified to have, a switch cavity therein. Examples of safety belt buckles which can easily be modified to provide a switch cavity therein are disclosed in U.S. patent application Ser. No. 441,912 filed Feb. 12, 1974 in the name of Arden Poulen, entitled "Laminated Buckle Housing, now U.S. Pat. No. 3,911,236";U.S. patent application Ser. No. 441,913 filed Feb. 12, 1974 in the name of Dornis Lavasseur, entitled "Buckle Housing now U.S. Pat. No. 3,919,505"; and U.S. patent application Ser. No. 506,070 filed Sept. 16, 1974 in the name of Robert L. Stephenson, entitled "Safety Belt Buckle"; each having a common assignee with the present invention.

EXAMPLE OF A BUCKLE FOR THE ELECTRIC SWITCH

Figure 1:
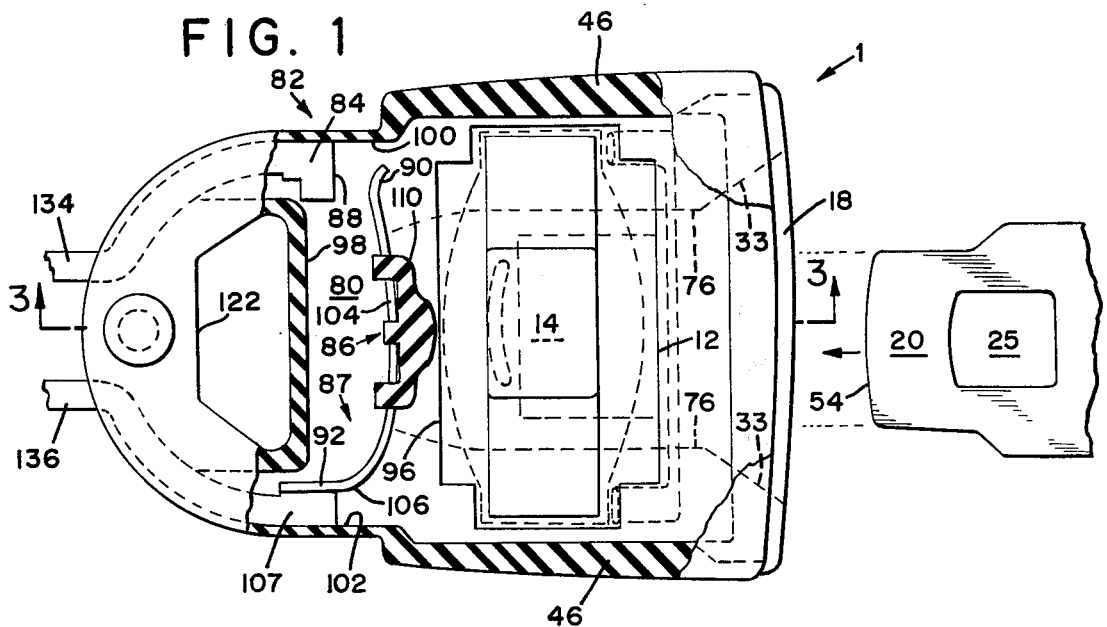
FIG. 1 is an enlarged plan view of a safety belt buckle in partial cross section to reveal interior components thereof and containing a first embodiment of the electric switch of the present invention in an open position of the electric switch.
Figure 2:
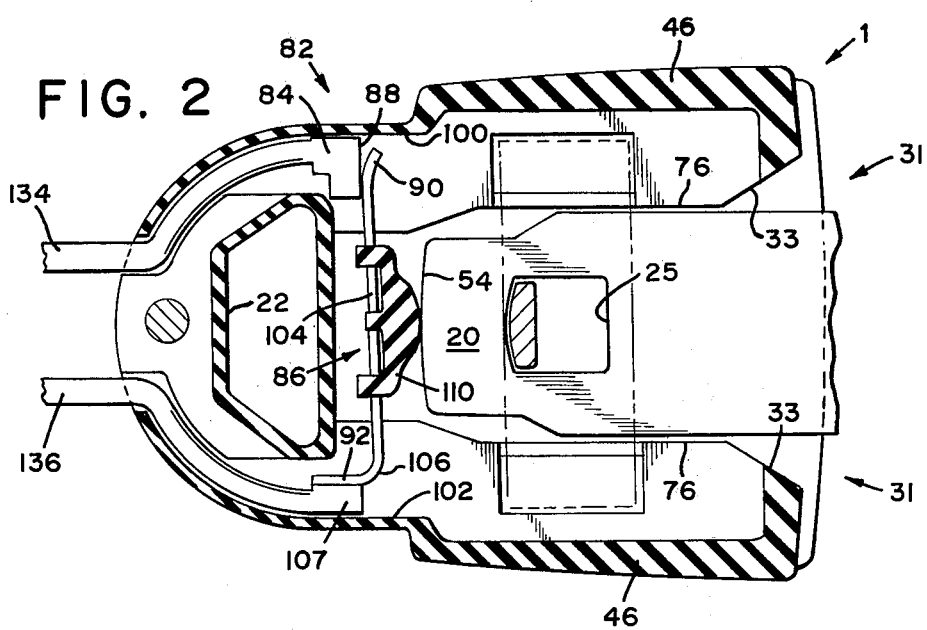
FIG. 2 shows the electric switch of FIG. 1 in its closed position.
Figure 3:
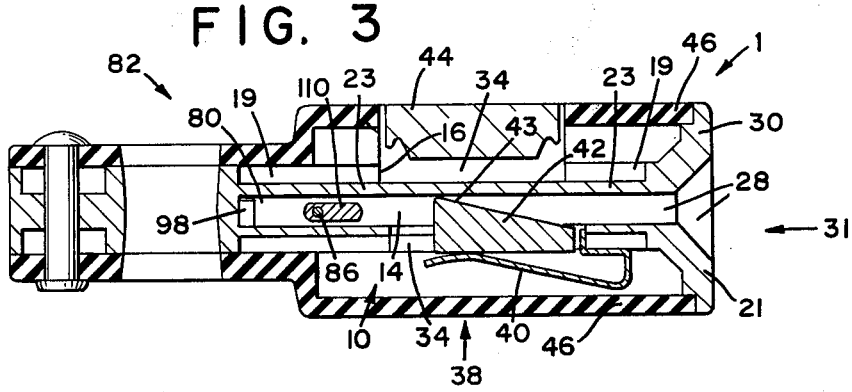
FIG. 3 is a longitudinal section taken along lines 3—3 of FIG. 1.

FIGS. 1–4 illustrate an example of a safety belt buckle in which the electric switch of the present invention may be used. The buckle, referred to generally by the numeral 1, includes a housing, referred to generally by the numeral 10 (FIG. 3) having an inlet opening 12 (FIG. 1) therein. A latch cavity 14 (FIG. 3) extends from the inlet opening through a portion of the interior of the housing 10 to a wall 16 of the housing 10 opposite the inlet opening 12. The inlet opening 12 communicates with the latch cavity 14 for receiving a tongue 20 of a seat belt (not shown) at one end of the buckle 1. At the opposite end of the buckle 1 from the inlet opening 12, the housing 10 has connecting means 22, such as an opening therein, for connecting the housing 10 to the seat belt. Housing 10 is formed of a plurality of laminated plates shown in FIG. 3. Referring to FIG. 3, a top plate 19 and a bottom plate 21 each have an opening 34 in the central portion thereof. The center plate 23 has an opening 28 extending from an edge 30 of the plate into the central portion thereof. The opening 28 forming part of center plate 23 has a guide means, generally indicated at 31, extending from the interior of the cavity 14 to the edge 30 on a tongue end of the housing 10 for guiding the tongue 20 into the cavity 14 of the housing 10. Each of the plates 19, 21 and 23 has a planar surface.

The number of laminated plates employed can vary depending on the desired depth for the latch cavity 14 and the type of material for the plates. Typically, the top and bottom plates 19 and 21 are die-stamped from metal such as steel, aluminum or the like, and the center plate is injection molded or otherwise formed of a polymeric material. Suitable polymeric materials include thermoplastic resins such as acetal homopolymer or copolymer of polycarbonate, as well as thermosetting resins as those of the phenolic type. Preferably, the housing 10 is comprised of at least three plates, including top, center and bottom plates. Each of the plates 19, 21 and 23 are formed using conventional equipment at very low cost.

The housing 10 is assembled by sandwiching a biasing means 40 and top and bottom plates 19 and 21, respectively, about the center plate 23 and fastening the assembled plates 19, 21 and 23 together by mechanical fastening means, such as rivets. Alternatively, the plates 19, 21 and 23 can be spot-welded or adhesively secured together using suitable epoxy resins or the like. Upon assembly of the plates 19, 21 and 23, to form an integral laminated housing unit, the guide means 31 is formed by spaced apart parallel walls 76 and bell-shaped extension 33 of which center plate 23 is comprised. The walls 76 and the extension 33 cooperate with the tip 54 of the tongue 20 to eliminate rough entry of the tongue 20 during its insertion into the latch cavity 14.

Referring to FIG. 3, a latching means and cover are shown in relation to the housing 10. The latching means, shown generally at 38, includes a biasing means 40, a latch bar 42 having a raised portion 43 adapted to mate with an opening 25 in the tongue 20, and a pushbutton 44. The latch bar 42 has a plurality of shoulders adapted to move within the opening 34 in the bottom plate 21 and the opening in the center plate 23. The biasing means 40 and latch bar 42 are disposed in the latch cavity 14 with at least portions thereof positioned in serial overlapping relationship in the direction in whcih the latch cavity 14 extends into the housing. Preferably, a cover 46 is disposed about the housing 10. Preferably the cover 46 comprises a single piece of light platic or the like. The cover 46 does not add appreciably to the strength or weight of the assembly but functions primarily to protect the components therein against contamination and accidental damage due to tampering. The cover 46 has sufficient strength and rigidity to withstand forces generated during depression of the pushbutton 44, and may, therefore, be used to support the biasing means 40. Preferably, the biasing means 40 is secured to housing 10 by the mechanical fastening means and does not contact the cover 46 when the latching means 38 is in the latched and positions. In the latter embodiment, the latching means 38 is functionally independent of the cover 46 and is not disabled by damage thereto.

In such a safety belt buckle 1 of the type including a housing 10 and a tongue 20 adapted to be inserted into the housing 10, the housing 10 also has a switch cavity 80 between the connecting means 22, where the housing 10 is connected to a seat belt and the latch cavity 14. The electric switch of the present invention is disposed in the switch cavity 80. Two embodiments of the electric switch are disclosed. The first embodiment of the electric switch is illustrated in FIGS. 1, 2 and 3. The second embodiment of the electric switch is illustrated in FIGS. 4–7.

FIRST EMBODIMENT OF THE ELECTRIC SWITCH

Referring to FIGS. 1, 2 and 3, the first embodiment of the electric switch is referred to generally by the numeral 82. The first embodiment 82 of the electric switch is disposed in the switch cavity 80 and includes: a stationary first contact member 84; a movable second contact member, referred to generally by the numeral 86; and a biasing means, referred to generally by the numeral 87, for the second contact member 86.

The stationary first contact member 84 has at least a line of contact and, preferably, a substantially planar contact surface 88, for contact by the second contact member 86. The movable second contact member 86 is an elongated, resilient, flexible, leaf spring having a movable contact end portion 90 and a stationary mounting end portion 92. Preferably, the second contact member 86 has a circular cross-section, shown in FIG. 3. The first embodiment 82 of the electric switch has a closed position, shown in FIG. 2, when the contact end portion 90 of the second contact member 86 is in electrical and mechanical contact with at least a portion of the contact surface 88 of the first contact member 84. The first embodiment 82 of the electric switch has an open position, shown in FIG. 1, when the contact end portion 90 of the second contact member 86 is spaced apart from and not in contact with the contact surface 88 of the first contact member 84. The biasing means 87 biases the second contact member 86 to the open position of the electric switch.

At least the contact end portion 90 of the second contact member 86 has motion which includes motion in a first plane when said second contact member is not in contact with the contact surface 88 of the first contact member 84. Such motion in the first plane occurs while the contact end portion 90 of the second contact member 86 is moving between the open position of the electric switch, as shown in FIG. 1, and the closed position of the electric switch, shown in FIG. 2. The first plane of motion is substantially parallel to the planar surfaces 26 of the top plate 19, bottom plate 21 and center plate 23 of the buckle 1. The first plane of motion is also substantially parallel to the plane of travel of the tongue 20 as the tongue 20 moves in and out of the buckle 1. The first embodiment 82 of the electric switch has means, described subsequently herein, by which the contact end portion 90 of the second contact member 86 makes a wiping and self-cleaning contact with at least a part of the line of contact on the contact surface 88 of the first contact member 84 upon actuation by the tongue 20 of the buckle 1 when the buckle 1 is inserted into the housing 10 of the buckle.

Referring to FIG. 1, the switch cavity 80 in which the electric switch is disposed has a front 96, a rear 98, a first side 100, and a second side 102. The front 96 of the switch cavity 80 is located where the tip 54 of the tongue 20 enters the switch cavity 80, as shown in FIG. 2 to engage the second contact member 86. The front 96 is adjacent to the wall 16 of the buckle 1. The wall 16 has a slot through which a portion of the tongue 20 including the tip 54 extends from the latch cavity 14 at least partially into the switch cavity 80. The rear 98 of the switch cavity 80 is adjacent to the connecting means 22 where the buckle 1 is attached to a safety belt (not shown). The first side 100 and the second side 102 of the switch cavity 80 are located opposite one another and between the front 96 and the rear 98 of the switch cavity 80.

The first contact member 84 is disposed adjacent to and, preferably, on the first side 100 of the switch cavity 80. The stationary mounting end portion 92 of the second contact member 86 is mounted adjacent to the second side 102 of the switch cavity 80. A portion of the second contact member 86 including the contact end portion 90 extends adjacent to at least a portion of the front 96 of the switch cavity 80. The movable contact end portion 90 of the second contact member 86 extends adjacent to the first side 100 of the switch cavity 80.

Referring to FIGS. 1 and 2, in the first embodiment 82 of the electric switch, the means for making a wiping, self-cleaning contact includes a middle portion 104 of the second contact member 86. The middle portion 104 is disposed between, and preferably integral with, the contact end portion 90 and the mounting end portion 92 of the second contact member 86. Referring to FIG. 1, in the open position of the first embodiment 82, the middle portion 104 has a substantially arcuate shape. The middle portion 104 has motion which includes motion in the first plane prior to intitial contact between the second contact member 86 and the first contact member 84. The middle portion 104 also has flexing motion in the first plane after initial contact between the second contact member 86 and the first contact member 84 in the closed position of the first embodiment 82 of the electric switch. The flexing motion of the middle portion 104 is caused by the tip 54 of the tongue 20 pressing against the second contact member 86.

Referring to FIG. 2, in the closed position of the first embodiment 82, the flexing motion of the middle portion 104 causes the substantially arcuate shape of the middle portion 104 to approach a straight line as a result of force transmitted by tip 54. The planar contact surface 88 of the first contact member 84 is disposed substantially perpendicular to the first plane of motion of the contact end portion 90 and the middle portion 104 of the second contact member 86. The motion of at least the contact end portion 90 of the second contact member 86 also includes motion in a second plane substantially parallel to the contact surface 88 of the first contact member 84 and substantially perpendicular to the first plane of motion after initial contact between the second contact member 86 and the first contact member 84 in the closed position during such flexing motion of the middle portion 104. The motion of the contact end portion 90 in the second plane provides a wiping and self-cleaning contact between the second contact member 86 and the first contact member 84. Such wiping and self-cleaningg contact removes dirt and other matter which might otherwise interfere with electrical contact.

Preferably an abutment member 110 is mounted on the middle portion 104 of the second contact member 86. The abutment member 110 presents a larger surface for engagement by the tip 54 of the tongue 20 and transmission of force. In the first embodiment 82 of the electric switch, the biasing means for the second contact member 86 is a bend 106 between the middle portion 104 and the stationary mounting end portion 92 of the second contact member 86. Preferably, the bend 106 is a smooth curve of approximately 90 degrees disposed adjacent to the second side 102 of the switch cavity 80 and adjacent to the front 96 of the switch cavity 80. The second contact member 86 also includes a stationary mounting means 107 which mounts the mounting end portion 92 of the second contact member 86 on the second side 102 of the switch cavity 80.

SECOND EMBODIMENT OF THE ELECTRIC SWITCH

Referring to FIGS. 4-8, the second embodiment of the electric switch is referred to generally by the numeral 112. The second embodiment 112 of the electric switch is disposed in the switch cavity 80 and includes: a stationary first contact member 114; a movable second contact member, referred to generally by the numeral 116; and a biasing means, such as a spiral spring 117 which biases the second contact member and is preferably integral with the second contact member 116. The stationary first contact member 114 has an incline 118 (FIGS. 6 and 7) which provides, at least a line of contact and, preferably, a substantially planar contact surface, for contact by the second member 116. The first contact member 114 is supported on a non-conductive support member 115. The movable second contact member 116 is an elongated, resilient, flexible, leaf spring having a movable contact end portion 120 and a stationary mounting end portion 122. Preferably, the second contact member 116 has a circular cross-section, shown in FIG. 7.

As in the first embodiment 82 of the electric switch shown in FIG. 1, the switch cavity 80 in which the second embodiment 112 of the electric switch is disposed has a front 96, a rear 98, a first side 100, and a second side 102. The front 96 of the switch cavity 80 is located where the tip 54 of the tongue 20 enters the switch cavity 80 to actuate the second contact member 116. The front 96 is adjacent to the the wall 16 of the buckle 1. The wall 16 has a slot through which a portion of the tongue 20, including the tip 54, extends from the latch cavity 14 at least partially into the switch cavity 80. The rear 98 of the switch cavity 80 is adjacent to the connecting means 22 where the buckle 1 is attached to a safety belt (not shown). The first side 100 and the second side 102 of the switch cavity 80 are located opposite one another and between the front 96 and the rear 98 of the switch cavity 80.

The first contact member 114 is disposed adjacent to and, preferably, on the first side 100 of the switch cavity 80. The stationary mounting end portion 112 of the second contact member 86 is mounted adjacent to and, preferably, on the second side 102 of the switch cavity 80. A portion of the second contact member 116 including the contact end portion 120 extends adjacent to at least a portion of the front 96 of the switch cavity 80. The movable contact end portion 120 of the second contact member 116 extends adjacent to the first side 100 of the switch cavity 80. The second embodiment 112 of the electric switch has a closed position, shown by dashed lines in FIGS. 4 and 7, when the contact end portion 120 of the second contact member 116 is in electrical and mechanical contact with at least a part of the incline 118 of the first contact member 14. The second embodiment 112 of the electric switch has an open position, shown by solid lines in FIGS. 4 and 7, when the contact end portion 120 of the second contact member 116 is only in contact with a non-conductive horizontal guide surface 119 of the support member 115 and not in contact with the conductive incline 118 of the first contact member 114 shown in FIG. 7. When the tongue 20 is inserted in the buckle, the tip 54 of the tongue 20 pushes the contact end portion 120 from its open position to its closed position. Stop members 121 and 123 are provided at either end of the guide surface 119 to limit motion of the contact end portion 120.

At least the contact end portion 120 of the second contact member 116 has motion which includes motion in a first plane when not in contact with the line of contact provided by the inclined member 118 of the first contact member 114. Such motion in the first plane occurs while the contact end portion 120 is sliding along the bottom guide surface 119 of the support member 115 between the open position of the electric switch, depicted by the contact end portion 120 shown in solid lines in FIG. 4, and the closed position of the electric switch, depicted by the contact end portion 120 shown in dashed lines in FIGS. 4 and 8. The first plane of motion is substantially parallel to the guide surface 119 and the planar surfaces of the top plate 19, bottom plate 21 and center plate 23 of the buckle 1. The first plane is also substantially parallel to the plane of travel of the tongue 20 as the tongue 20 moves in and out of the buckle 1. The second embodiment 112 of the electric switch has means by which the contact end portion 120 of the second contact member 116 makes a wiping and self-cleaning contact with at least a line of contact on the first contact member 114 upon actuation by the tongue 20 of the buckle 1 when the buckle 1 is inserted into the housing 10 of the buckle 1.

Referring to FIGS. 4–7, in the second embodiment 112 of the electric switch, the means for making a wiping, self-cleaning contact includes the incline 118 on the first contact member 114. The first contact member 114 preferably is an L-shaped appendage (FIG. 6) having the incline 118 (FIG. 7) on its bottom which cooperates with the contact end portion 120 of the first contact member 114. Referring to FIG. 7, the first contact member 114 has a front end 130 and a rear end 132. The front end 130 of the first contact member 114 is closer to the front 96 of the switch cavity 80 than the rear end 132. The incline 118 slopes downwardly from the front end 130 to the rear end 132. The incline 118 is preferably arranged at an angle of less than 45 degrees with the guide surface 119 and with the first plane of motion of at least the contact end portion 120 of the second contact member 116. The guide surface 119 (FIG. 7) disposed on the first contact member 114 is approximately parallel to the top plane 19, bottom plate 21 and center plate 23 of the buckle 1. The bottom guide surface 119 guides the contact end portion 120 of the second contact member 116 when the contact end portion 120 of the second contact member 116 is not in contact with the incline 118. The motion of at least the contact end portion 120 of the second contact member 116 also includes motion in a third plane during contact between the second contact member 116 and the inclined member 118. The third plane of motion is substantially parallel to the incline 118 of the first contact member 114. The contact end portion 120 slides along the incline 118 during movement through said third plane of motion thereby making a wiping and self-cleaning contact. Such wiping and self-cleaning contact removes dirt and other matter which might otherwise interfere with electrical contact.

Preferably, an abutment member 110 is mounted on the middle portion 104 of the second contact member 86. The abutment member 110 presents a larger surface for engagement by the tip 54 of the tongue 20 and transmission of force to actuate the second contact member 116.

OPERATION

Both embodiments 82 and 112 of the electric switch are normally open and close upon actuation, such as by the tongue 20. The tongue 20 is inserted into inlet means 18 and latch cavity 14, bringing opening 25 above raised portion 43 of latch bar 42. The biasing means 40 moves the raised portion 43 into locking engagement with opening 25 of the tongue 20. The tip 54 of tongue 20 pushes the second contact member 86 of the first embodiment 82 or the second contact member 116 of the second embodiment 112 of the electric switch into contact with the first contact member 84 or 114, closing the electric switch and transmitting an electrical signal to circuitry for disabling the engine interlock and/or alarm means of the vehicle. To disengage the buckle 1, pushbutton 44 is depressed. The pushbutton 44 forces the latch bar 42 downward until the raised portion 43 is below the opening 25 of tongue 20, allowing the tongue 20 to be removed from the buckle 1. Removal of the tongue 20 allows the second contact member 86 or 116 to move away from the first contact member 84 or 114 under the force of the biasing means, opening the electric switch. Referring to both embodiments, one of the contact members, such as the first contact member 84 or 114, may be connected by an electric wire 134 to a source of electrical power. The other contact member, such as the second contact member 86 or 116, may be connected by an electric wire 136 to a starter engine interlock and/or alarm circuitry of the vehicle.

Both embodiments 82 and 112 of the electric switch are adapted for use in a wide variety of buckles. Both embodiments have a self-cleaning operation which reduces malfunctions resulting, for example, from dirt or other matter forming in the electrical contact area of the switch. Both embodiments are small enough to fit in a limited space, are simple and economical to manufacture and assemble, and are durable in operation.

I claim:
1. A buckle comprising:
a housing defining a switch cavity;
an electric switch disposed in said switch cavity, said electric switch including a stationary first contact member, a movable second contact member, and a biasing means for said second contact member;
said stationary first contact member having at least a line of contact;
said second contact member having an elongated shape, a movable contact end portion and a stationary mounting end portion;
said electric switch having a closed position when said contact end portion of said second contact member is in contact with said line of contact of said first contact member and an open position when said contact end portion of said second contact member is not in contact with said line of contact of said first contact member, said biasing means biasing said second contact member to the open position of said electric switch;
at least said contact end portion of said second contact member having motion which includes motion in a first plane when said second contact member is not in contact with said line of contact of said first contact member and while said contact end portion of said second contact member is moving between said open position of said electric switch and said closed position of said electric switch; and said electric switch having means by which said contact end portion of said second contact member makes a wiping, self-cleaning contact with at least a part of said line of contact of said first contact member upon actuation of said second contact member by said tongue of said buckle when said tongue is inserted into the housing of said buckle.

2. The buckle according to claim 1 wherein:
said switch cavity has a front where a tongue enters said switch cavity to actuate said second contact member, a rear, a first side and a second side;
said first contact member is disposed adjacent said first side of said switch cavity;
said stationary mounting end portion of said second contact member is disposed adjacent to said second side of said switch cavity; and
said second contact member is disposed adjacent to said front of said switch cavity, said contact end portion of said second contact member adjacent to said first side of said switch cavity and said first contact member.

3. The buckle according to claim 1 and further comprising: an abutment member disposed on said movable second contact member between said contact end portion and said stationary mounting end portion, said abutment member having an actuation surface facing the direction in which the tongue is inserted into the housing of the buckle for abutment by said tongue to transmit force from said tongue to said second contact member when said tongue is inserted into the housing of said buckle to move said second contact member to said closed position of said electric switch.

4. The buckle according to claim 1 wherein:
said means for making a wiping, self-cleaning contact comprises a middle portion of said second contact member, said middle portion has a substantially arcuate shape between said contact end portion and said mounting end portion of said second contact member;
said middle portion has flexing motion after initial contact between said second contact member and said first contact member in said closed position of said electric switch, said flexing motion causing said arcuate shape of said middle portion to approach a straight line;
said first contact member has a substantially planar contact surface which includes side line of contact of said first contact member, said contact surface is disposed substantially perpendicular to said first plane of motion of at least said contact end portion of said second contact member; and
said motion of at least said contact end portion of said second contact member also includes motion in a second plane substantially parallel to said contact surface of said first contact member and substantially perpendicular to said first plane of motion after initial contact between said second contact member and said first contact member in said closed position of said electric switch, said motion of said contact end portion in said second plane providing a wiping and self-cleaning contact between said second contact member and said first contact member.

5. The buckle according to claim 3 wherein:
said biasing means for said second contact member is a bend between a middle portion and said stationary mounting end portion of said second contact member, said bend having a smooth curve of approximately 90° adjacent to said second side of said switch cavity and adjacent to said front of said switch cavity; and
said second contact member further includes a stationary mounting means mounted on said second side of said switch cavity.

6. The buckle according to claim 1 wherein:
said means for making a wiping, self-cleaning contact comprises an incline disposed on said first contact member for contact by said second contact member, said incline having a front end and a rear end, said front end of said incline disposed closer to said front of said switch cavity than said rear end, said incline sloping downward from said front end to said rear end; and
said motion of at least said contact end portion of said second contact member also includes motion in a third plane after initial contact between said second contact member and said incline on said first contact member in said closed position of said electric switch, said third plane of motion being substantially parallel to said incline, said contact end portion sliding along said incline during movement through said third plane of motion, said second contact member thereby making a wiping and self-cleaning contact with said incline on said first contact member.

7. The buckle according to claim 2 wherein: said biasing means for said second contact member is a coil spring disposed at said stationary mounting end portion of said second contact member adjacent to said second side of said switch cavity and adjacent to said front of said switch cavity.

8. The buckle according to claim 6 and further comprising: a guide surface on said first contact member to guide said contact end portion of the second contact member when said contact member is not in contact with said incline.

9. In a safety belt buckle of the type including a housing and a tongue adapted to be inserted into the housing, the housing having a switch cavity therein, the improvement comprising:
an electric switch disposed in said switch cavity, said electric switch including a stationary first contact member, a movable second contact member, a biasing means for said second contact member and an abutment member;
said stationary first contact member having a substantially planar contact surface;
said second contact member being an elongated resilient, flexible, leaf spring having a movable contact end portion and a stationary mounting end portion;
said electric switch having a closed position when said contact end portion of said second contact member is in contact with said contact surface of said first contact member and an open position when said contact end portion of said second contact member is not in contact with said contact surface of said first contact member, said biasing means biasing said second contact member to the open position of said electric switch;

at least said contact end portion of said second contact member having motion which includes motion in a first plane when said second contact member is not in contact with said contact surface of said first contact member and while said contact end portion is moving between said open position of said electric switch and said closed position of said electric switch;

said electric switch having means by which said contact end portion of said second contact member makes a wiping, self-cleaning contact with at least a part of said contact surface of said first contact member upon actuation of said second contact member by said tongue of said buckle when said tongue is inserted into the housing of said buckle and after initial contact by said contact end portion of said second contact member with said contact surface of said first contact member;

said switch cavity having a front where the tongue enters said switch cavity to actuate said second contact member, a rear adjacent to where said buckle is attached to said safety belt, a first side and a second side; and first contact member disposed adjacent to said first side of said switch cavity; said stationary mounting end portion of said second contact member is disposed adjacent to said second side of said switch cavity; and a portion of said second contact member including said contact end portion extending adjacent to at least a portion of said front of said switch cavity, said contact end portion of said second contact member disposed adjacent to said first side of said switch cavity;

said abutment member disposed on said movable second contact member between said contact end portion and said stationary mounting end portion; said abutment member having an actuation surface facing the direction in which the tongue is inserted into the housing of the buckle for abutment by said tongue to transmit force from said tongue to said second contact member when said tongue is fully inserted into the housing of said buckle to move said second contact member to said closed position of said electric switch;

said means for making a wiping, self-cleaning contact comprising a middle portion of said second contact member, said middle portion having a substantially arcuate shape between said contact end portion and said mounting end portion of said second contact member;

said middle portion having flexing motion in said first plane after initial contact between said second contact member and said first contact member in said closed position of said electric switch, said flexing motion causing said arcuate shape of said middle portion to approach a straight line;

said planar contact surface of said first contact member disposed substantially perpendicular to said first plane of motion of at least said contact end portion of said second contact member;

said motion of at least said contact end portion of said second contact member also including motion in a second plane substantially parallel to said contact surface of said first contact member and substantially perpendicular to said first plane of motion after initial contact between said second contact member and said first contact member in said closed position of said electric switch, said motion of said contact end portion in said second plane providing a wiping and self-cleaning contact between said second contact member and said first contact member;

said biasing means for said second contact member being a bend between said middle portion and said stationary mounting end portion of said second contact member, said bend having a smooth curve of approximately 90° adjacent said second side of said switch cavity and adjacent to said front of said switch cavity; and said second contact member further includes a stationary mounting means mounted on said second side of said switch cavity.

10. In a safety belt buckle of the type including a housing and a tongue adapted to be inserted into the housing, the housing having a switch cavity therein, the improvement comprising:

an electric switch disposed in said switch cavity, said electric switch including a stationary first contact member, a movable second contact member, and a biasing means for said second contact member a support member, and an abutment member;

said stationary first contact member having a line of contact for contact by said second contact member;

said second contact member having an elongated shape, a movable contact end portion and a stationary mounting end portion;

said electric switch having a closed position when said contact end portion of said second contact member is in contact with said line of contact of said first contact member and an open position when said contact end portion of said second contact member is not in contact with said contact surface of said first contact member, said biasing means biasing said second contact member to the open position of said electric switch;

at least said contact end portion of said second contact member having motion which includes motion in a first plane when said second contact member is not in contact with said line of contact of said first contact member and while said contact end portion of said second contact member is moving between said open position of said electric switch and said closed position of said electric switch; and said electric switch having means by which said contact end portion of said second contact member makes a wiping, self-cleaning contact with at least a part of said line of contact of said first contact member upon actuation of said second contact member by said tongue of said buckle when said tongue is inserted into the housing of said buckle and after initial contact by said contact end portion of said second contact member with said contact surface of said first contact member;

said switch cavity having a front where the tongue enters said switch cavity to actuate said second contact member, a rear adjacent to where said buckle is attached to said safety belt, a first side and a second side; said first contact member disposed adjacent to said first side of said switch cavity; said stationary mounting end portion of said second contact member is disposed adjacent to said second side of said switch cavity; and a portion of said second contact member including said contact end portion extending adjacent to at least a portion of said front of said switch cavity, said contact end portion of said second contact member disposed adjacent to said first side of said switch cavity;

said abutment membe disposed on said movable second contact member between said contact end portion and said stationary mounting end portion; said abutment member having an actuation surface facing the direction in which the tongue is inserted into the housing of the buckle abutment by said tongue to transmit force from said tongue to said second contact member when said tongue is fully inseted into the housing of said buckle to move said second contact member to said closed position of said electric switch;

said means for making a wiping, self-cleaning contact comprises an incline disposed on said first contact member for contact by said second contact member, said incline having a front end and a rear end, said front end of said incline disposed closer to said front of said switch cavity than said rear end, said incline sloping downward from said front end to said rear end;

said incline of said planar contact surface of said first contact member is disposed at an angle of less than 45 with said first plane of motion of said contact end portion of said second contact member;

said motion of at least said contact end portion of said second contact member also includes motion in a third plane after intitial contact between said second contact member and said incline on first contact member in said closed position of said electric switch, said third plane of motion being substantially parallel to said incline, said contact end portion sliding along said incline during movement through said third plane of motion and thereby making a wiping and self-cleaning contact, said second contact member thereby making a wiping and self-cleaning contact with said incline on said first contact member; and said biasing means for said second contact member being a coil spring disposed at said stationary mounting end portion of said second contract member adjacent to said second side of said switch cavity and adjacent to said front of said switch cavity.

11. An electric switch comprising:

a stationary first contact member, a movable second contact member, and a biasing means for said second contact member;

said stationary first contact member having at least a line of contact;

said second contact member having an elongated shape, a movable contact end portion and a stationary mounting end portion;

said electric switch having a closed position when said contact end portion of said second contact member is in contact with said line of contact of said first contact member and an open position when said contact end portion of said second contact member is not in contact with said line of contact of said first contact member, said biasing means biasing said second contact member to the open position of said electric switch;

at least said contact end portion of said second contact member having motion which includes motion in a first plane when said second contact member is not in contact with said line of contact of said first contact member and while said contact end portion of said second contact member is moving between said open position of said electric switch and said closed position of said electric switch; and said electric switch having means by which said contact end portion of said second contact member makes a wiping, self-cleaning contact with at least a part of said line of contact of said first contact member upon actuation of said second contact member.

12. The electric switch according to claim 1 and further comprising:

an enclosure defining a switch cavity having a front, a rear, a first side and a second side; and wherein:

said first contact member is disposed adjacent said first side of said switch cavity;

said stationary mounting end portion of said second contact member is disposed adjacent to said second side of said switch cavity; and said second contact member is disposed adjacent to said front of said switch cavity, said contact end portion of said second contact member adjacent to said first side of said switch cavity and said first contact member.

13. The electric switch according to claim 1 and further comprising: an abutment member disposed on said movable second contact member between said contact end portion and said stationary mounting end portion, said abutment member having an actuation surface to trasmit an actuating force to said second contact member to move said second contact member to said closed position of said electric switch.

14. The electric switch according to claim 1 wherein:

said means for making a wiping, self-cleaning contact comprises a middle portion of said second contact member, said middle portion has a substantially arcuate shape between said contact end portion and said mounting end portion of said second contact member;

said middle portion has a flexing motion after initial contact between said second contact member and said first contact member in said closed position of said electric switch, said flexing motion causing said arcuate shape of said middle portion to approach a staight line;

said first contact member has a substantially planar contact surface which includes said line of contact of said first contact member, said contact surface is disposed substantially perpendicular to said first plane of motion of at least said contact end portion of said second contact member; and said motion of at least said contact end portion of said second contact member also includes motion in a second plane substantially parallel to said contact surface of said first contact member and substantially perpendicular to said first plane of motion after initial contact between said second contact member and said first contact member in said closed position of said electric switch, said motion of said contact end portion in said second plane providing a wiping and self-cleaning contact between said second contact member and said first contact member.

15. The electric switch according to claim 3 wherein:

said biasing means for said second contact member is bend between a middle portion and said stationary mounting end portion of said second contact member, said bend having a smooth curve of approximately 90 degrees adjacent to said second side of said switch cavity and adjacent to said front of said switch cavity; and said second contact member further includes a stationary mounting means mounted on said second side of said switch cavity.

16. The electric switch according to claim 1 wherein:

said means for making a wiping, self-cleaning contact comprises an incline disposed on said first contact member for contact by said second contact member, said incline having a front end and a rear end, said front end of said incline disposed closer to said front of said switch cavity then said rear end, said incline sloping downward from said front end to said rear end; and said motion of at least said contact end portion of said second contact member also includes motion in a third plane after initial contact between said second contact member and said incline on said first contact member in said closed position of said electric switch, said third plane of motion being substantially parallel to said incline, said contact end portion sliding along said incline during movement through said third plane of motion, said second contact member thereby making a wiping and self-cleaning contact with said incline on said first contact member.

17. The electric switch according to claim 2 wherein: said biasing means for said second contact member is a coil spring disposed at said stationary mounting end portion of said second contact member adjacent to said second side of said switch cavity and adjacent to said front of said switch cavity.

18. The electric switch according to claim 6 and further comprising: a guide surface on said first contact member to guide said contact end portion of the second contact member when said second contact member is not in contact with said incline.

19. An electric switch comprising:

a housing defining a switch cavity;

a stationary first contact member, a movable second contact member, a biasing means for said second contact member and an abutment member;

said stationary first contact member having a substantially planar contact surface;

said second contact member being an elongated resilient, flexible, leaf spring having a movable contact end portion and a stationary mounting end portion;

said electric switch having a closed position when said contact end portion of said second contact member is in contact with said contact surface of said first contact member and an open position when said contact end portion of said second contact member is not in contact with said contact surface of said first contact member, said biasing means biasing said second contact member to the open position of said electric switch;

at least said contact end portion of said second contact member having motion which includes a motion in a first plane when said second contact member is not in contact with said contact surface of said first contact member and while said contact end portion is moving between said open position of said electric switch and said closed position of said electric switch;

said electric switch having means by which said contact end portion of said second contact member makes a wiping, self-cleaning contact with at least a part of said contact surface of said first contact member upon actuation of said second contact member and after initial contact by said contact end portion of said second contact member with said contact surface of said first contact member;

said switch cavity having a front where a tongue enters said switch cavity to actuate said second contact member, a rear adjacent to where said buckle is attached to said safety belt, a first side and a second side; said first contact member disposed adjacent to said first side of said switch cavity; said stationary mounting end portion of said second contact member is disposed adjacent to said second side of said switch cavity; and a portion of said second contact member including said contact end portion extending adjacent to at least a portion of said front of said switch cavity, said contact end portion of said second contact member disposed adjacent to said first side of said switch cavity;

said abutment member disposed on said movable second contact member between said contact end portion and said stationary mounting end portion, said abutment member having an actuation surface to transmit an actuating force to said second contact member to move said second contact member to said closed position of said electric switch;

said means for making a wiping, self-cleaing contact comprising a middle portion of said second contact member, said middle porton having a substantially arcuate shape between said contact end portion and said mounting end portion of said second contact member;

said middle portion having flexing motion in said first plane after initial contact between said second contact member and said first contact member in said closed position of said electric switch, said flexing motion causing said arcuate shape of said middle portion to approach a straight line;

said planar contact surface of said first contact member disposed substantially perpendicular to said first plane of motion of at least said contact end portion of said second contact member;

said motion of at least said contact end portion of said second contact member also including motion in a second plane substantially parallel to said contact surface of said first contact member and substantially perpendicular to said first plane of motion after initial contact between said second contact member and said first contact member in said closed position of said electric switch, said motion of said contact end portion in said second plane providing a wiping and self-cleaning contact between said second contact member and said first contact member;

said biasing means for said second contact member being a bend between said middle portion and said stationary mounting end portion of said second contact member, said bend having a smooth curve of approximately 90° adjacent said second side of said switch cavity and adjacent to said front of said switch cavity; and said second contact member further includes a stationary mounting means mounted on said second side of said switch cavity.

20. An electric switch comprising:

a housing defining a switch cavity;

a stationary first contact member, a movable second member, and a biasing means for said second contact member, a support member, and an abutment member;

said stationary first contact member having a line of contact for contact by said second contact member;

said second contact member having an elongated shape, a movable contact end portion and a stationary mounting end portion;

said electric switch having a closed position when said contact end portion of said second contact member is in contact with said line of contact of said first contact member and an open position when said contact end portion of said second contact member is not in contact with said contact surface of said first contact member, said biasing means biasing said second contact member to the open position of said electric switch;

at least said contact end portion of said second contact member having motion which includes motion in a first plane when said second contact member is not in contact with said line of contact of said first contact member and while said contact end portion of said second contact member is moving between said open position of said electric switch and said closed position of said electric switch; and said electric switch having means by which said contact end portion of said second contact member makes a wiping, self-cleaning contact with at least a part of said line of contact of said first contact member upon actuation of said second contact member and after initial contact by said contact end portion of said second contact member with said contact surface of said first contact member;

said switch cavity having a front where a tongue enters said switch cavity to actuate said second contact member, a rear adjacent to where said buckle is attached to said safety belt, a first side and a second side; said first contact member disposed adjacent to said first side of said switch cavity; said stationary mounting end portion of said second contact member is disposed adjacent to said second side of said switch cavity; and a portion of said second contact member including said contact end portion extending adjacent to at least a portion of said front of said switch cavity, said contact end portion of said second contact member disposed adjacent to said first side of said switch cavity;

said abutment member disposed on said movable second contact member between said contact end portion and said stationary mounting end portion, said abutment member having an actuation surface to transmit an actuating force to said second contact member to move said second contact member to move said second contact member to said closed position of said electric switch;

said means for making a wiping, self-cleaning contact comprises an incline disposed on said first contact member for contact by said second contact member, said incline having a front end and a rear end, said front end of said incline disposed closer to said front of said switch cavity than said rear end, said incline sloping downward from said front end to said rear end;

said incline of said planar contact surface of said first contact member is disposed at an angle of less than 45 with said first plane of motion of said contact end portion of said second contact member;

said motion of at least said contact end portion of said second contact member also includes motion in a third plane after initial contact between said second contact member and said incline on first contact member in said closed position of said electric switch, said third plane of motion being substantially parallel to said incline, said contact end portion sliding along said incline during movement through said third plane of motion and thereby making a wiping and self-cleaning contact, said second contact member thereby making a wiping and self-cleaning contact with said incline on said first contact member; and said biasing means for said second contact member being a coil spring disposed at said stationary mounting end portion of said second contact member adjacent to said second side of said switch cavity and adjacent to said front of said switch cavity.

* * * * *

UNITED STATES PATENT AND TRADEMARK OFFICE
CERTIFICATE OF CORRECTION

PATENT NO. : 4,000,385
DATED : December 28, 1976
INVENTOR(S) : Arduino Colasanti It is certified that error appears in the above-identified patent and that said Letters Patent are hereby corrected as shown below:

Column 1, line 29, after "3,880,379" there should be a --.--.

Column 2, line 19, after "safety" insert --belt--, same column, line 37, after "Housing", insert --"--, same line after "3,911,236" delete --"--. Same column, line 40, after "Housing" insert --",--, same line "3,919,505" should read --3,919,508--.

Column 3, line 46, "whcih" should read --which--, same column, line 49, after "light" insert --weight-- and after weight, "platic" should read --plastic--. Same column, line 59, after "and", insert --unlatched--.

Column 5, line 58, "self-cleaningg" should read --self-cleaning--.

Column 6, line 25, after "second" insert --contact--, same column, line 65 "14" should read --114--.

Column 10, line 44, after "said", insert --second--.

Column 11, line 23, "and" second occurrence should read --said--.

Column 13, line 5, "membe" should be --member--, same column, line 13, "inseted" should be --inserted--, same column, line 43, "contract" should be --contact--.

Colume 14, line 46, "staight" should be --straight--.

Signed and Sealed this

Twenty-ninth Day of March 1977

[SEAL]

Attest:

RUTH C. MASON
Attesting Officer

C. MARSHALL DANN
Commissioner of Patents and Trademarks